United States Patent
Lawless et al.

(10) Patent No.: US 7,775,242 B2
(45) Date of Patent: Aug. 17, 2010

(54) SOLID STATE REGULATOR FOR NATURAL GAS

(75) Inventors: William N. Lawless, Westerville, OH (US); Robert W. Arenz, Powell, OH (US)

(73) Assignee: CeramPhysics, Inc., Westerville, OH (US)

( * ) Notice: Subject to any disclaimer, the term of this patent is extended or adjusted under 35 U.S.C. 154(b) by 80 days.

(21) Appl. No.: 12/202,788

(22) Filed: Sep. 2, 2008

(65) Prior Publication Data

US 2009/0084455 A1  Apr. 2, 2009

Related U.S. Application Data

(60) Provisional application No. 60/970,117, filed on Sep. 5, 2007.

(51) Int. Cl.
*F15D 1/02* (2006.01)
(52) U.S. Cl. .............................. 138/46; 138/45; 137/501
(58) Field of Classification Search .................. 138/45, 138/46; 137/501; 251/129.06
See application file for complete search history.

(56) References Cited

U.S. PATENT DOCUMENTS

| | | | | |
|---|---|---|---|---|
| 2,444,677 A | * | 7/1948 | Rosenblum | 138/45 |
| 2,454,929 A | * | 11/1948 | Kempton | 138/45 |
| 2,489,932 A | * | 11/1949 | Rosenblum | 138/43 |
| 2,728,355 A | * | 12/1955 | Dahl | 138/45 |
| 2,851,060 A | * | 9/1958 | Fleischer et al. | 138/46 |
| 2,948,296 A | * | 8/1960 | Thorburn | 137/517 |
| 4,344,459 A | * | 8/1982 | Nelson | 138/45 |
| 4,515,534 A | | 5/1985 | Lawless et al. | 417/322 |
| 4,609,014 A | | 9/1986 | Jurjevic et al. | 138/45 |
| 4,688,433 A | * | 8/1987 | Silverwater | 73/861.53 |
| 4,846,665 A | | 7/1989 | Abbasi | 431/1 |
| 5,101,854 A | | 4/1992 | Bron | 137/501 |
| 5,190,075 A | | 3/1993 | Tentler et al. | 137/501 |
| 5,222,713 A | | 6/1993 | Lawless et al. | 251/129.06 |
| 5,302,111 A | | 4/1994 | Jouvaud et al. | 431/1 |
| 5,465,905 A | | 11/1995 | Elder | 239/75 |
| 6,068,751 A | | 5/2000 | Neukermans | 204/601 |
| 6,568,602 B1 | | 5/2003 | Bram et al. | 239/5 |
| 6,679,278 B2 | | 1/2004 | Lemoine et al. | 137/12 |
| 7,036,490 B2 | | 5/2006 | Veinotte | 123/520 |
| 7,222,643 B2 | * | 5/2007 | Bailey | 138/45 |

* cited by examiner

*Primary Examiner*—Patrick F Brinson
(74) *Attorney, Agent, or Firm*—Dinsmore & Shohl LLP

(57) ABSTRACT

An annular elastomer is provided in a housing orifice that does not require a large force for deformation. This makes possible a solenoid-type actuator that provides a large displacement of the elastomer, thus allowing higher and lower rates of gas flow through a gas line.

8 Claims, 1 Drawing Sheet

SOLID STATE REGULATOR FOR NATURAL GAS

CROSS-REFERENCE TO RELATED APPLICATIONS

This application claims the benefit of U.S. Provisional Application Ser. No. 60/970,117 filed Sep. 5, 2007.

TECHNICAL FIELD

Embodiments of the present invention generally relate to a solid state regulator configured to adjustably control a flow rate of natural gas passing through a gas line where the open/close position of the regulator, and, thus, the rate of gas flowing past the regulator, may be electronically monitored. Embodiments of the present invention are refinements of the embodiments taught in U.S. Pat. No. 5,222,713, the entire disclosure of which is hereby incorporated by reference.

BACKGROUND

Gas-fired appliances and systems in residential, commercial, and industrial applications typically are equipped with mechanical regulators that are well known in the art and have remained essentially unchanged for many years. A significant disadvantage of these mechanical regulators is that they cannot be easily or inexpensively interfaced with electronic feedback control. This becomes an increasingly serious obstacle to efficiency as more sophisticated sensors are developed for monitoring combustion efficiency in order to reduce fuel consumption, CO, and $CO_2$.

The polluting gas $NO_x$ is also a by-product of burning fossil fuels and has come under increasing recent scrutiny at the State and Federal levels. A proven method of reducing $NO_x$ in natural gas combustion is so-called "oscillating combustion" wherein the amplitude of the natural gas flow is varied in time (U.S. Pat. Nos. 4,846,665 and 5,202,111). This application requires a regulating valve that can not only vary the frequency of the gas amplitude (e.g., about 5-10 Hz) but also be under electronic feedback control.

Embodiments of the invention by Lawless and Arenz (U.S. Pat. No. 5,222,713) satisfied the above requirements, but the embodiments may benefit from further development. A "central orifice" design and an "edge orifice" design for the elastomer were taught (see FIG. 3 and FIG. 12-B of the '713 patent), and a large force is needed to vary the size of such orifices. Such large forces are provided by electrostrictive, piezoelectric, and magnetostrictive actuators, but all carry small displacements. Small displacements may limit the possible variations in the orifice size to relatively small gas flow rates. Also, these types of actuators may be expensive, the electro- and piezoelectric actuators may be subject to long-term dielectric failure, and the magnetostrictive actuator may require an energizing magnet.

Embodiments of the present invention are refinements of the embodiments of the '713 patent relative to an apparatus for regulating the flow of fluids in general and of natural gas in particular. The embodiments of the present invention both simplify the embodiments of the '713 patent and economically allow the regulation of a much larger gas flow, while preserving the feature of controlling the flow rate via the motion-amplification of an elastomeric material. In addition, the feature of electronic feedback control is also utilized in the present embodiments.

SUMMARY

An annular elastomer is provided in a housing orifice that does not require a large force for deformation. This makes possible a solenoid-type actuator that provides a large displacement of the elastomer, thus allowing higher and lower rates of gas flow through a gas line and great control thereof. The electric current supplied to the actuator controls the actuator displacement and, thus, the gas flow through electronic feedback control. The elastomer is bonded to the interfacing metal parts of the regulator for mechanical stability and greater reliability. Finally, the actuator displacements of the present invention are still relatively small, which allows for long life and good reliability.

BRIEF DESCRIPTION OF THE SEVERAL VIEWS OF THE DRAWINGS

The following detailed description of specific embodiments of the present invention can be best understood when read in conjunction with the following drawings, where like structure is indicated with descriptive identifiers and in which.

DETAILED DESCRIPTION

The purpose of the invention is to accurately and economically monitor combustion efficiency of natural gas in order to reduce consumption thereof by controlling gas flow with an electronically monitored regulator. Specifically, the invention permits control over a flow rate of natural gas with a regulator using motion-amplification of an elastomeric material to adjust gas flow where the regulator may be monitored by electronic feedback control.

Figure 1:
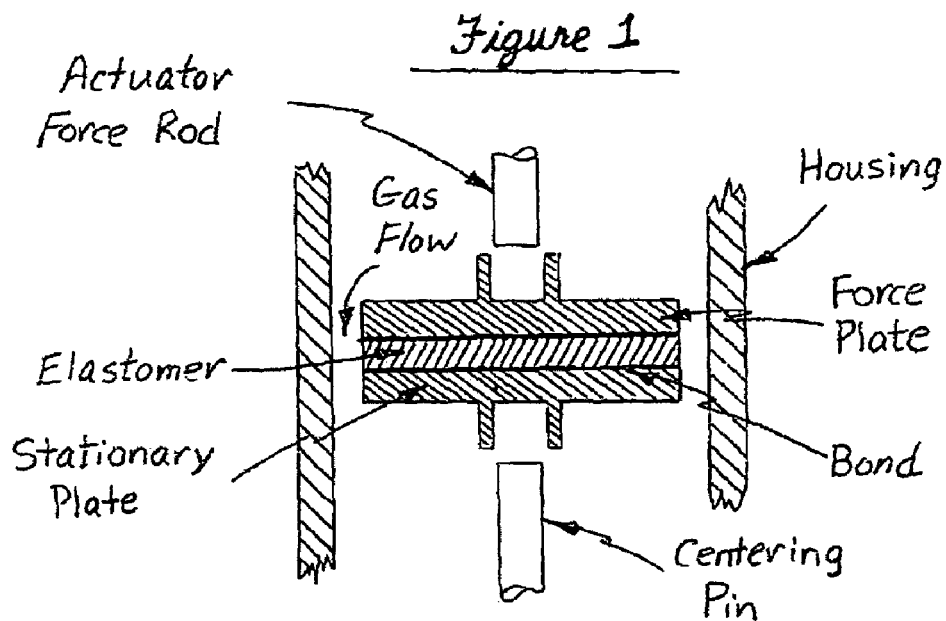
FIG. 1 is an illustration of an embodiment of a solid state regulator.

Referring to the cross-section drawing shown in FIG. 1 (all parts are circular), the Elastomer is confined between the metal Force Plate and the metal Stationary Plate in the "Open" state of the regulator, while the Gas Flow takes place between the outer diameters of the Force Plate/Stationary Plate/Elastomer and the inner diameter of the metal Housing, or pipe of the gas line. The Bond is an agent that firmly bonds the Elastomer to the Force Plate and to the Stationary Plate. The Force Plate and the Stationary Plate each have wells, as shown. The Actuator Force Rod is captured in the well of the Force Plate and a Centering Pin is captured in the well of the Stationary Plate. The Stationary Plate may be firmly attached to the Housing by means of the Centering Pin. This configuration maintains the desired alignment of the Elastomer relative to the Housing.

Figure 2:
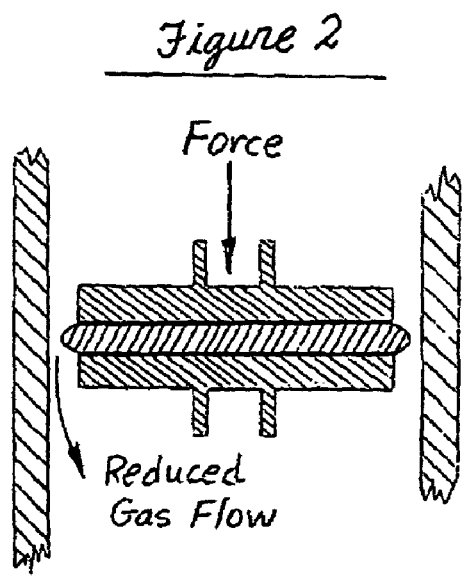
FIG. 2 is an illustration of another embodiment of a solid state regulator.

The solenoid (not shown) consists of a stationary coil with several turns of a wire, such as copper wire, and a magnetic rod located in the center of the coil. This magnetic rod is attached collinearly to the top of the Actuator Force Rod, as shown in FIG. 1. According to one embodiment, if an electric DC current is supplied to said coil, the magnetic rod is forced downward, causing a Force to be applied to the Elastomer via the Actuator Force Rod and the Force Plate. The Elastomer extrudes into the annular space between the Plates and the Housing and reduces the Gas Flow, as shown in FIG. 2. As more DC current is supplied, the Elastomer is further compressed and extruded into the annular space, thereby further reducing the Gas Flow. Alternatively, if less DC current is supplied, the Elastomer recedes, partially or entirely (depending on the amount of current supplied) to between the Plates, thereby increasing the Gas Flow. Thus, an infinite variation in the gas flow is achieved by variations in the DC current to the solenoid coil under electronic feedback control.

The Bond in FIG. 1 ensures that the upper face of the Elastomer will follow the vertical movements of the Force Plate while the lower face of the Elastomer will remain immobile and attached to the Stationary Plate. The Bond generally must adhere firmly to the Elastomer and to the Plates and "set" at or near room temperature. Several suitable bonds will serve this purpose and are generally silicone adhesives based on oxime chemistry. Several remaining details of the embodiments of the present invention may remain unchanged from those taught in the '713 patent.

It is noted that any appendices or attachments to the above description of the present invention form an integral part of the description and should be considered part of the present application.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. It is further noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A solid state regulator comprising a circular elastomer forming an annular orifice between an outer diameter of the elastomer and an inner diameter of a metal housing, wherein the elastomer is bonded to an actuator force plate and to a stationary plate.

2. The solid state regulator of claim 1, wherein an actuator force rod is captured in a well in the actuator force plate.

3. The solid state regulator of claim 2 wherein a magnetic rod of a solenoid actuator is attached to the actuator force rod.

4. The solid state regulator of claim 3 wherein an electric-current activation of the solenoid actuator causes a force to be applied to the elastomer via the magnet rod and actuator force rod and the actuator force plate.

5. The solid state regulator of claim 4 wherein an extrusion of the elastomer into a portion of the annular orifice occurs by the force exerted by the solenoid actuator.

6. The solid state regulator of claim 5 wherein a restricted flow of the fluids occurs by a partial blocking of the annular orifice by the elastomer extrusion.

7. The solid state regulator of claim 1 wherein electronic control of the electric current applied to the solenoid actuator under feedback control is based on signals from appropriate sensors in the fluids exiting the orifice.

8. The solid state regulator of claim 7, wherein the control of the flow of fluids through the orifice occurs by the electronic control of the electronic current.

\* \* \* \* \*